UNITED STATES PATENT OFFICE.

WILHELM C. A. THIELEPAPE AND HERMAN KROESCHELL, OF CHICAGO, ILLINOIS.

IMPROVEMENT IN BASES FOR COLORS IN PAINTING WITH SOLUBLE SILICATES.

Specification forming part of Letters Patent No. 163,898, dated June 1, 1875; application filed September 9, 1874.

*To all whom it may concern:*

Be it known that we, WILHELM C. A. THIELEPAPE and HERMAN KROESCHELL, both of Chicago, in the county of Cook and State of Illinois, have made an invention of a new and useful application of the chemical compound of alumina and lime as the essential base for all paints to be fixed and made permanent by the soluble silicate of soda or potassa, or both combined, on woods, metals, glass, on natural or artificial stones, on plaster of lime, mortar or cements, on linen or cotton canvas, and on all other materials; and we do hereby declare that the following is a full, clear, and exact description of the preparation of and operation with the same, which will enable others skilled in the art to make and use the same.

The general application of the soluble silicates of soda or potash, or both combined, to render certain water-colors permanent has been hitherto very limited, on account of the want of proper means to make said colors adhesive and cohesive enough to resist the action of the brush in applying the solution of the silicates. The substances used since for this purpose were starch, paste, glue, skimmed milk, &c., which proved to a certain degree an obstruction to the chemical action of the silicates with the paints. Our invention does away at once with all these difficulties, and furnishes a substance, which not alone combines with the wooden fiber, metals, minerals, and mineral compositions, but also has the property of forming a chemical compound with the silica of the soluble silicates, which compound resists the action of the air, water, and heat to a high degree.

Our above-named compound of alumina and lime is prepared by slaking fresh-burned lime in a solution of alum in water, (ammonia alum preferred,) and the separation of unslaked portions therefrom.

The *modus operandi* of using this our compound as a paint is as follows, to wit: All objects to be painted are treated first with a milky soup of our compound, either with a brush or by means of submersion, which, after being allowed to dry, are now treated for the first time with the soluble silicates in the well-known and usual manner. The so-prepared and well-dried objects are now ready to receive the first coat of our compound, in the usual consistency of paint, either by itself when a white color is desired, or intermixed with the suitable mineral colors or cements, the same to be made permanent again, after having been allowed to dry, by the application of one or more coats or saturations of the silicates in the usual manner.

In case that one coat of our compound alone or intermixed, as aforesaid, should prove not sufficient, it may be repeated indefinitely, provided that each coat is fixed by the application of the silicates, as above mentioned.

Having thus described our invention, we claim as new and desire to secure by Letters Patent—

The process herein described of obtaining a base for paints, consisting in slaking quicklime in a solution of ammonia alum, as set forth.

WILHELM C. A. THIELEPAPE.
HERMAN KROESCHELL.

Witnesses:
WM. H. LOTZ,
CHAS. THURMAN.